United States Patent
Pattyn

(10) Patent No.: US 9,242,685 B2
(45) Date of Patent: Jan. 26, 2016

(54) SNOWMOBILE TRACK STUD SUPPORT

(75) Inventor: Ronald C. Pattyn, Ravenna, MI (US)

(73) Assignee: Liberty Products, Inc., Ravenna, MI (US)

( * ) Notice: Subject to any disclaimer, the term of this patent is extended or adjusted under 35 U.S.C. 154(b) by 568 days.

(21) Appl. No.: 13/593,320

(22) Filed: Aug. 23, 2012

(65) Prior Publication Data

US 2013/0049453 A1 Feb. 28, 2013

Related U.S. Application Data

(60) Provisional application No. 61/527,483, filed on Aug. 25, 2011.

(51) Int. Cl.
  *B62D 55/28* (2006.01)
  *B62M 27/02* (2006.01)

(52) U.S. Cl.
  CPC ........ *B62D 55/286* (2013.01); *B62M 2027/027* (2013.01)

(58) Field of Classification Search
  CPC .... B62D 55/286; B62D 55/28; B62D 55/244; B62D 55/288
  USPC ......... 305/160, 161, 162, 165, 167, 168, 171, 305/177, 178, 179, 180, 191
  See application file for complete search history.

(56) References Cited

U.S. PATENT DOCUMENTS

| | | | |
|---|---|---|---|
| D157,905 S * | 3/1950 | Risk | D15/28 |
| 3,973,808 A | 8/1976 | Janssen et al. | |
| 5,234,266 A | 8/1993 | Musselman et al. | |
| 5,273,351 A | 12/1993 | Rubel | |
| 5,299,860 A | 4/1994 | Anderson | |
| 5,685,621 A | 11/1997 | Nugent | |
| 5,690,398 A | 11/1997 | Pribyl | |
| 5,707,123 A | 1/1998 | Grob | |
| 5,716,112 A | 2/1998 | Staszak | |
| 5,897,177 A | 4/1999 | Bergstrom | |
| 5,921,642 A * | 7/1999 | Tschida | 305/180 |
| 6,109,705 A * | 8/2000 | Courtemanche | 305/178 |
| 6,203,126 B1 | 3/2001 | Harguth | |
| 6,213,573 B1 * | 4/2001 | Nakayama | 305/51 |
| 6,296,330 B1 * | 10/2001 | Hall | 305/180 |
| 6,609,772 B2 * | 8/2003 | Musselman et al. | 305/180 |
| 7,377,601 B2 * | 5/2008 | Katoh et al. | 305/180 |
| 7,380,628 B2 * | 6/2008 | Bedard | 180/190 |
| 7,712,846 B2 * | 5/2010 | Schindler et al. | 305/178 |
| 7,845,741 B2 | 12/2010 | Musselman | |
| 9,004,618 B1 * | 4/2015 | Delisle et al. | 305/174 |
| 2005/0168068 A1 * | 8/2005 | Courtemanche et al. | 305/168 |
| 2006/0273660 A1 * | 12/2006 | Dandurand et al. | 305/166 |
| 2007/0052292 A1 | 3/2007 | Musselman | |
| 2012/0299372 A1 * | 11/2012 | Kruger | 305/192 |

* cited by examiner

*Primary Examiner* — Kip T Kotter

(74) *Attorney, Agent, or Firm* — Price Heneveld LLP

(57) ABSTRACT

A snowmobile traction stud support and enhancement device includes a base and at least one boss that extends from the base. Each boss includes a boss aperture through which a stud can pass. Support flanges around the at least one boss can be longer, shorter or equal to the length of the at least one boss. The support flanges extend from the at least one boss to a base plate, and can be tapered or straight, with differing wall cross-sections. The stud support is lightweight, has improved traction, and heightened resistance to bending, thereby increasing performance characteristics.

20 Claims, 22 Drawing Sheets

SNOWMOBILE TRACK STUD SUPPORT

CROSS-REFERENCE TO RELATED APPLICATION

This application claims the benefit of and priority to U.S. Provisional Patent Application No. 61/527,483, filed on Aug. 25, 2011, entitled "SNOWMOBILE TRACK STUD SUPPORT," the entire disclosure of which is hereby incorporated herein by reference.

BACKGROUND OF THE INVENTION

Typically, studs are affixed to the flexible track of a snowmobile to provide added traction. A stud is ordinarily a metal nail or pin which penetrates the snow or ice for the purpose of enhancing the vehicle's traction, thereby increasing its speed and performance. The stud is mounted through the track and through the backer plate to help stabilize the stud and to prevent the stud from pulling through the track. A mechanical fastener, such as a nut, is then used to secure the stud and backer plate to the track.

SUMMARY OF THE PRESENT INVENTION

One aspect of the present invention includes a snowmobile track stud support having a base and first and second bosses that extend from the base. Each boss includes a boss aperture within which a stud can be disposed. A central support flange extends from and is disposed between the first and second bosses. A first side flange extends from the first boss to a first edge of the base and a second side flange extends from the second boss to a second edge of the base. The central support flange, the first side flange, and the second side flange together define a web.

Another aspect of the present invention includes a snowmobile track stud support having a base and a boss that extends from the base, and which includes a boss aperture within which a stud can be disposed. The stud support further includes a plurality of support flanges that extend from the boss to an edge of the base According to another aspect of the present invention includes a snowmobile track stud having a base, and first and second bosses extending from the base. Each boss includes a boss aperture. Further, a central support flange extends from and is disposed between the first and second bosses and includes at least one peak that extends beyond the first and second bosses. A first side flange extends from the first boss to a first edge of the base, and a second side flange extends from the second boss to a second edge of the base. The central support flange, the first side flange, and the second side flange together define a web.

These and other aspects, objects, and features of the present invention will be understood and appreciated by those skilled in the art upon studying the following specification, claims, and appended drawings.

DETAILED DESCRIPTION OF EMBODIMENTS

Figure 3:
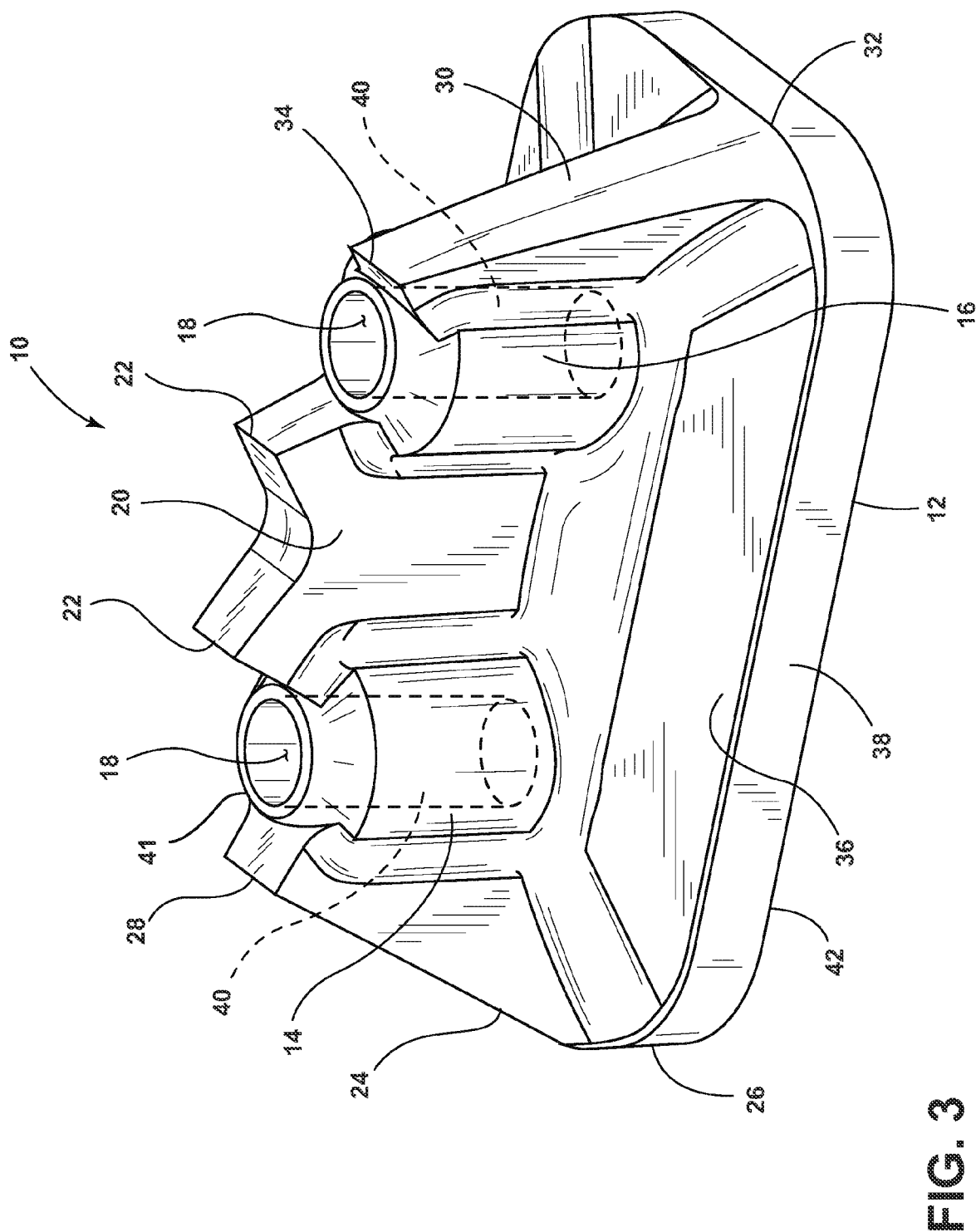
FIG. 3 is a perspective view of a first embodiment of a stud support of the present invention.
Figure 4:
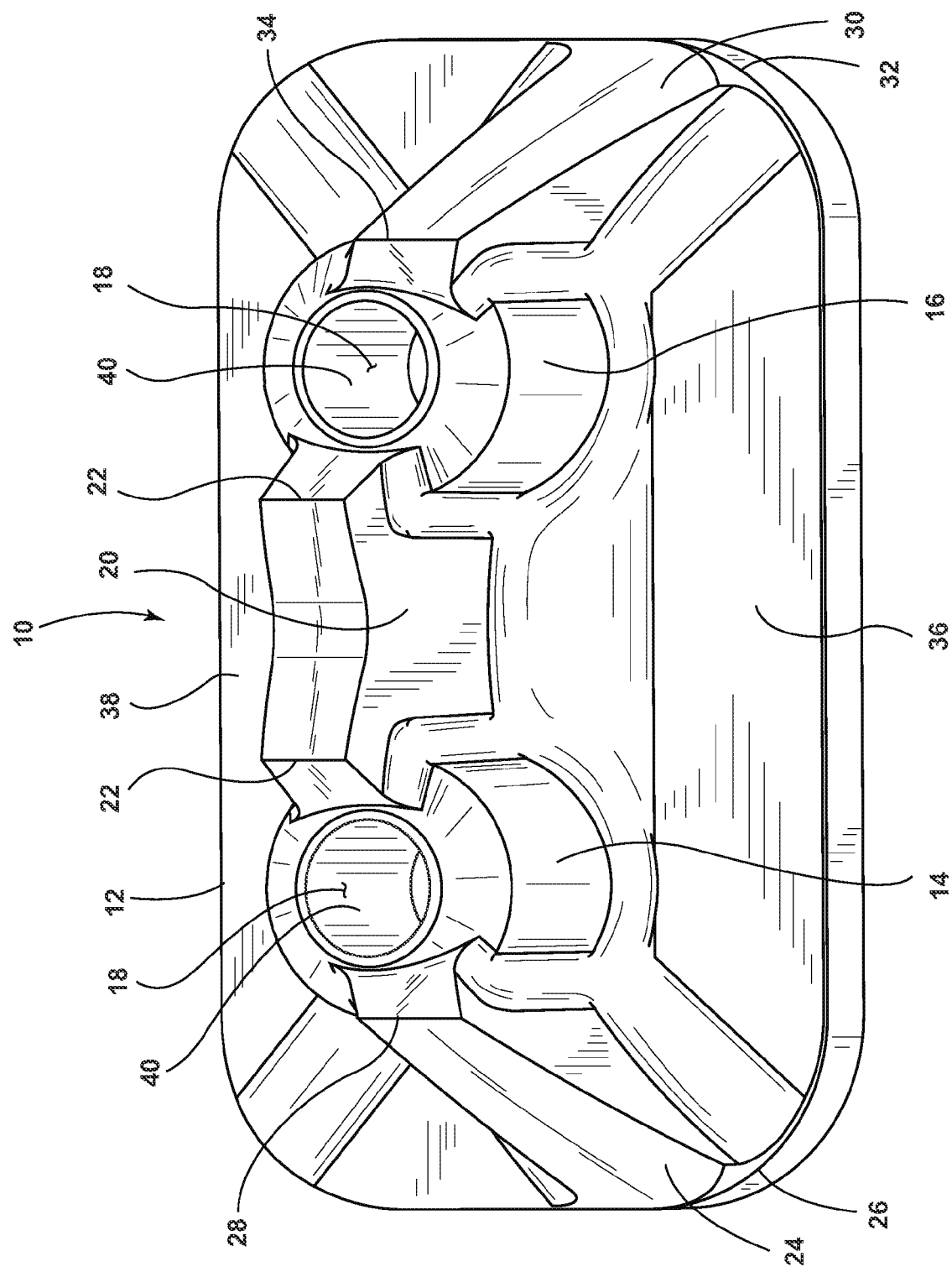
FIG. 4 is a top perspective view of the stud support of FIG. 3.
Figure 5:
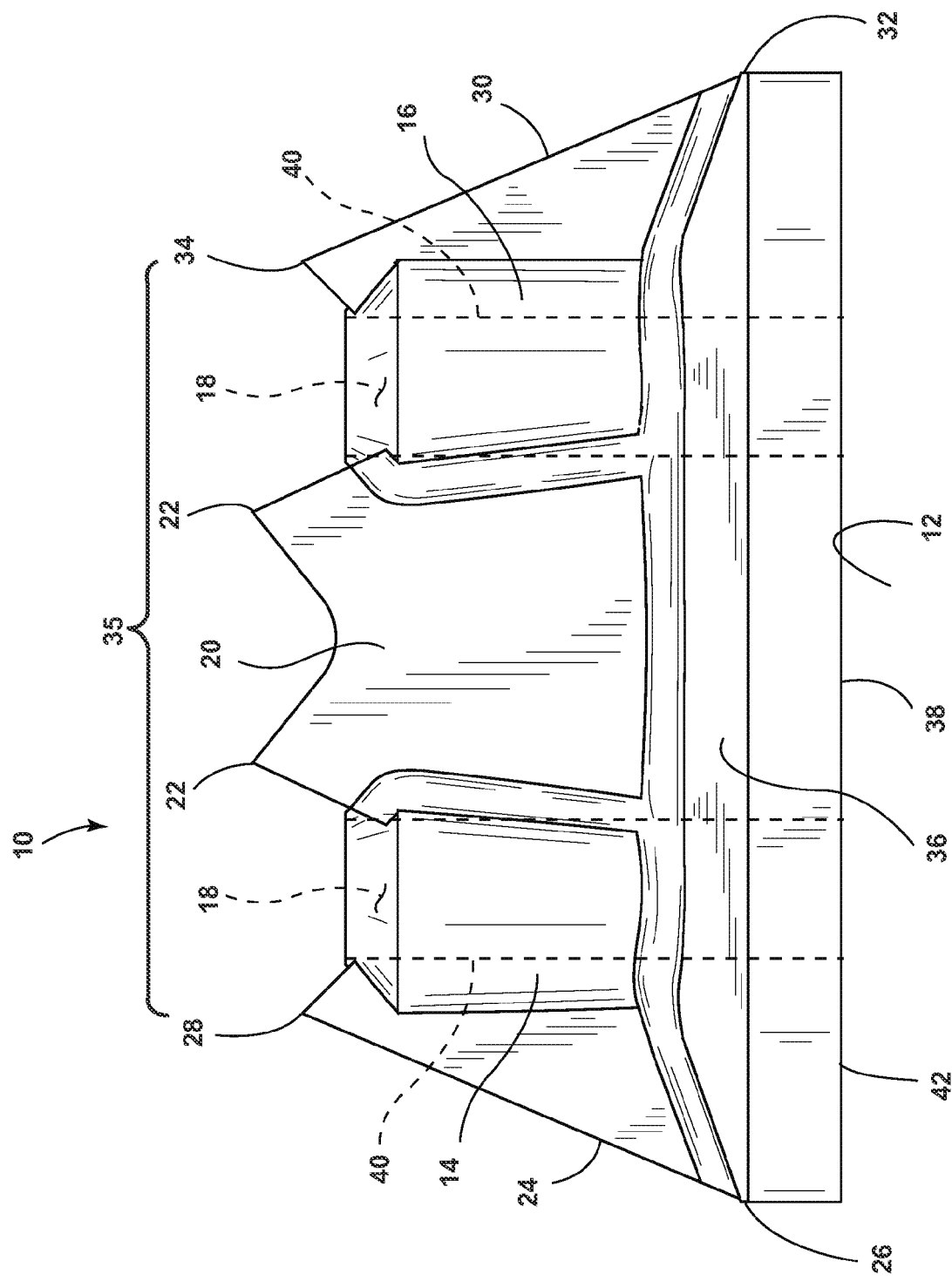
FIG. 5 is a side view of the stud support of FIG. 3.
Figure 6:
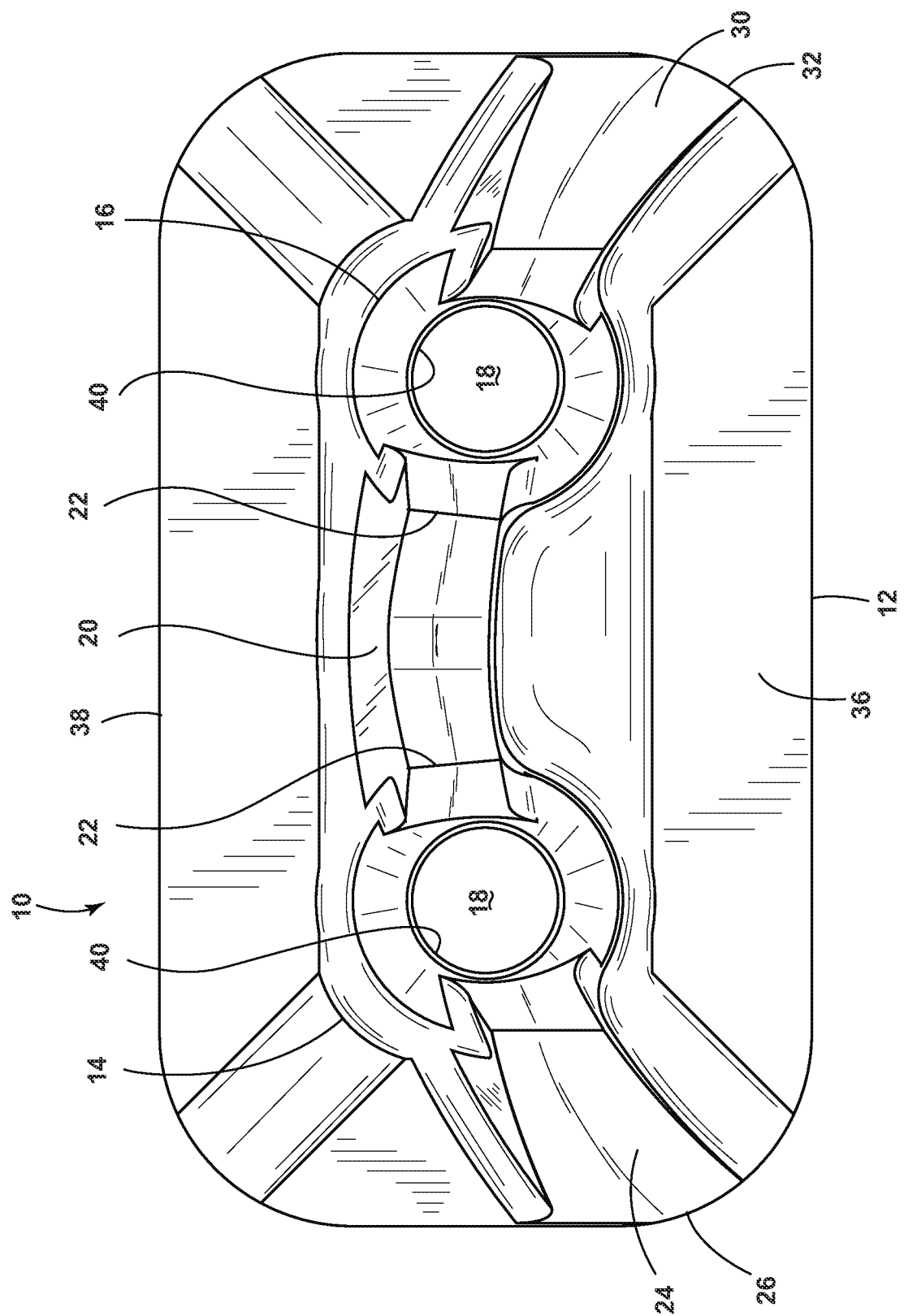
FIG. 6 is a top view of the stud support of FIG. 3.

For purposes of description herein, the terms "upper," "lower," "right," "left," "rear," "front," "vertical," "horizontal," and derivatives thereof shall relate to the invention as oriented in FIG. 3. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
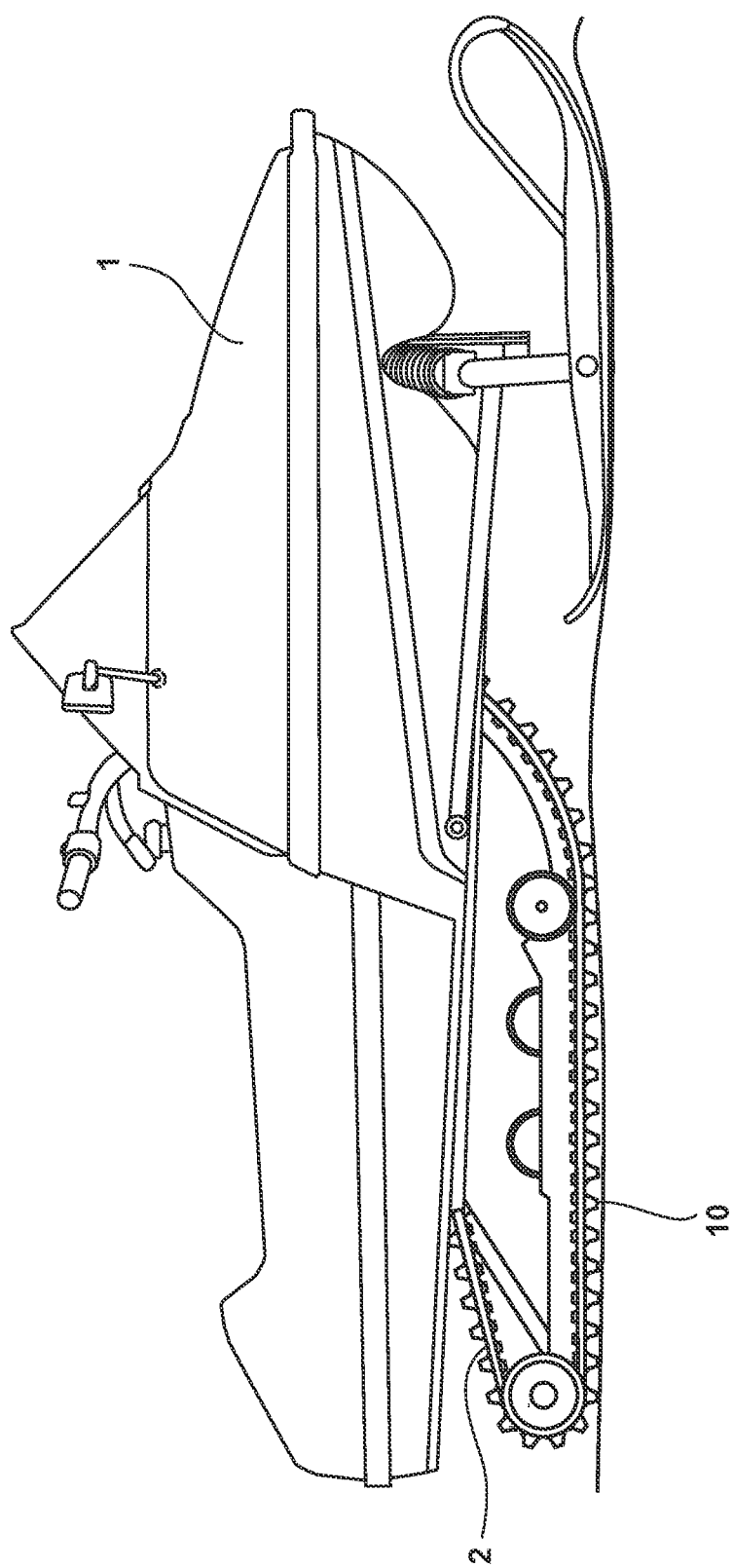
FIG. 1 is a side view of a snowmobile having a track and a stud support of the present invention.
Figure 2:
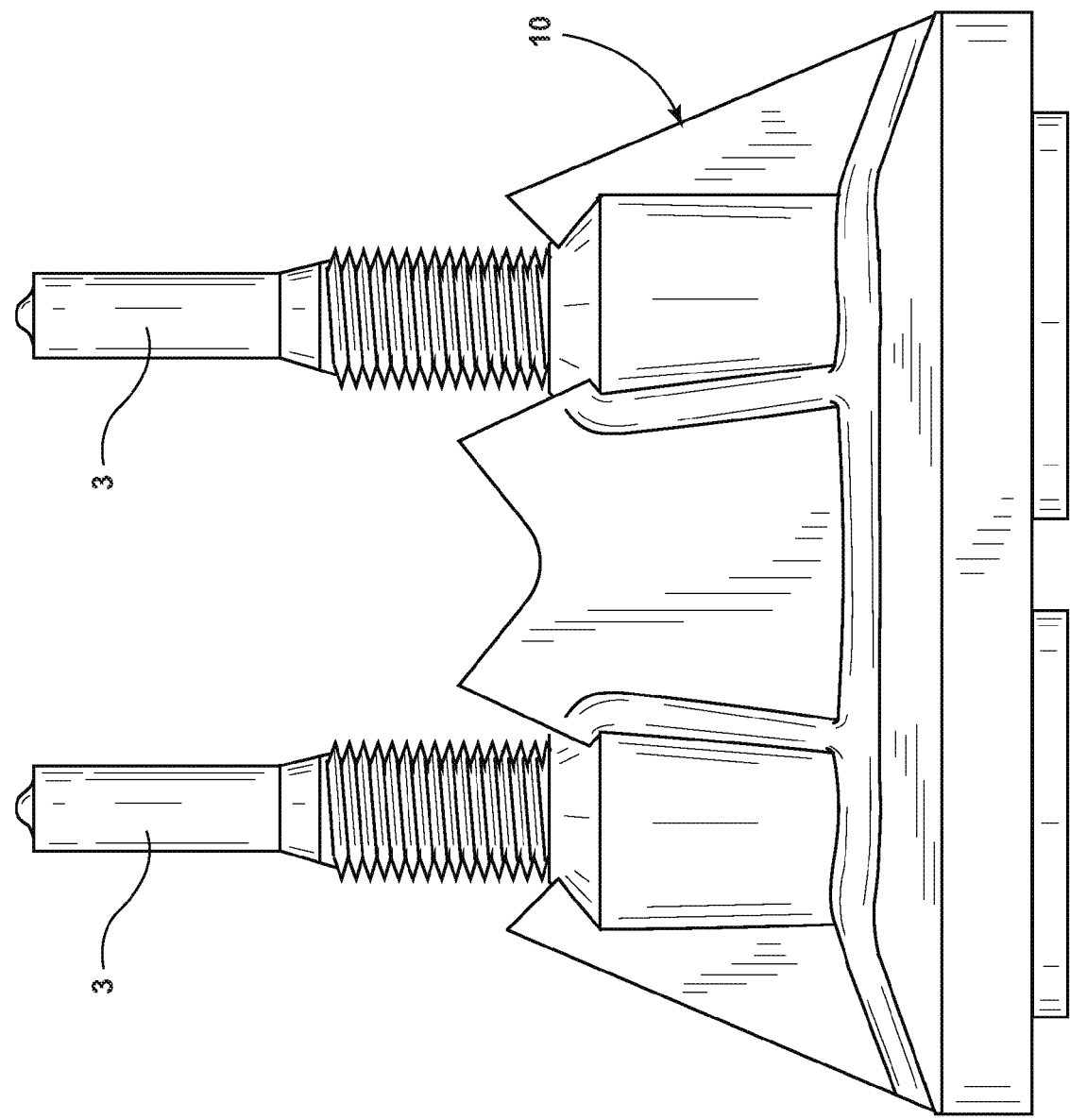
FIG. 2 is a side view of a stud support of the present invention having two studs assembled thereto.

Referring to the embodiment illustrated in FIGS. 1 and 2, the reference numeral 10 generally designates a stud support designed for use with a stud 3 removably connected with a flexible track 2 of a snowmobile 1. The stud support 10 provides traction to the flexible track 2 such that the flexible track 2 can more efficiently move the snowmobile 1 over snow covered terrain.

Referring now to FIGS. 3-6, the stud support 10 includes a base 12 and first and second bosses 14, 16 which extend upward from the base 12. The first and second bosses 14, 16 may be cylindrical, octagonal, square, etc. It is contemplated that the first and second bosses 14, 16 may extend at an angle relative to the base 12, such that studs 3 may be juxtapositioned at various angles. Each of the first and second bosses 14, 16 includes a boss aperture 18 and a smooth bore 40 defined by a smooth cylindrical wall. Alternatively, the smooth bore 40 can have various cross-sections, such as oval, tri-oval, etc. Further, the smooth bore 40 may include a wall having various engagement surfaces, such as threads, textures, or the like. The boss aperture 18 may be replaced with a capped or overmolded member positioned over the smooth bore 40. Further, the first and second bosses 14, 16 are spaced from one another a predetermined distance and may be beveled or chamfered at a distal end 41 thereof.

A central support flange 20 is disposed between the first and second bosses 14, 16. The central support flange 20 is in the form of a simple wall or rib and includes at least one peak 22 formed in the distal end 41 thereof. In the illustrated embodiment, the central support flange 20 includes first and second peaks 22. The height of the central support flange 20 is configured to be greater than the height of the first and second bosses 14, 16, such that the peak 22 extends above the first and second bosses 14, 16. Further, the central support flange 20 may be slightly arcuate in horizontal cross-section. In the illustrated embodiment, the stud support 10 is shown as having two peaks 22. The arcuate construction of the central support flange 20 helps catch snow or ice, thereby providing better traction and speed to the snowmobile 1.

A first side flange 24 extends from the first boss 14 and is positioned generally opposite the central support flange 20, across the diameter of the first boss 14. The first side flange 24 tapers inwardly from a first edge 26 of the base 12 to a first peak 28 adjacent the first boss 14. Further, the first side flange 24 tapers downwardly from the first peak 28 to the boss aperture 18 disposed in the first boss 14. The height of the first peak 28 is configured to be greater than the height of the first boss 14, such that the first peak 28 extends above the first boss 14.

A second side flange 30 is basically a mirror image of the first side flange 24 and tapers inwardly from a second edge 32 of the base 12 to a second peak 34 adjacent the second boss 16. The second side flange 30 tapers downwardly from the second peak 34 to the boss aperture 18 disposed in the second boss 16.

Additionally, in the illustrated embodiment of FIGS. 3-7, the first and second side flanges 24, 30 are slightly arcuate in horizontal cross-section, and the thicknesses of the first and second side flanges 24, 30 proximate the base 12 are greater than the thickness at the first and second peaks 28, 34.

In the example illustrated in FIGS. 3-7, the two peaks 22 of the central support flange 20 have a height greater than that of the first and second peaks 28, 34 of the first and second side flanges 24, 30. Alternatively, the height of the two peaks 22, the first peak 28, and the second peak 34 may be equal. Further, the height of the two peaks 22, the first peak 28, and the second peak 34 may be less than the height of the first and second bosses 14, 16. Together, the central support flange 20, the first side flange 24, and the second side flange 30 define an arcuate web 35, which enables the stud support 10 to provide additional traction for the snowmobile 1 (FIG. 1). It is contemplated that the central support flange 20 and the first and second side flanges 24, 30 can define a linearly extending web 35 across the base 12 of the stud support 10. Further, multiple parallel or non-parallel webs 35 may extend across the base 12. The central support flange 20 and the first and second side flanges 24, 30 provide lateral support to the base 12, thereby preventing deflection of the base 12 during use. Accordingly, the studs 3 generally maintain a consistent orientation relative to the base 12, thereby increasing their effectiveness and durability. Furthermore, there may be any number of bosses operably connected with the base 12. The upper surface of the base 12 defines a tapered top wall 36 that tapers downwardly from a center portion 38 thereof to the first and second edges 26, 32.

Figure 7:
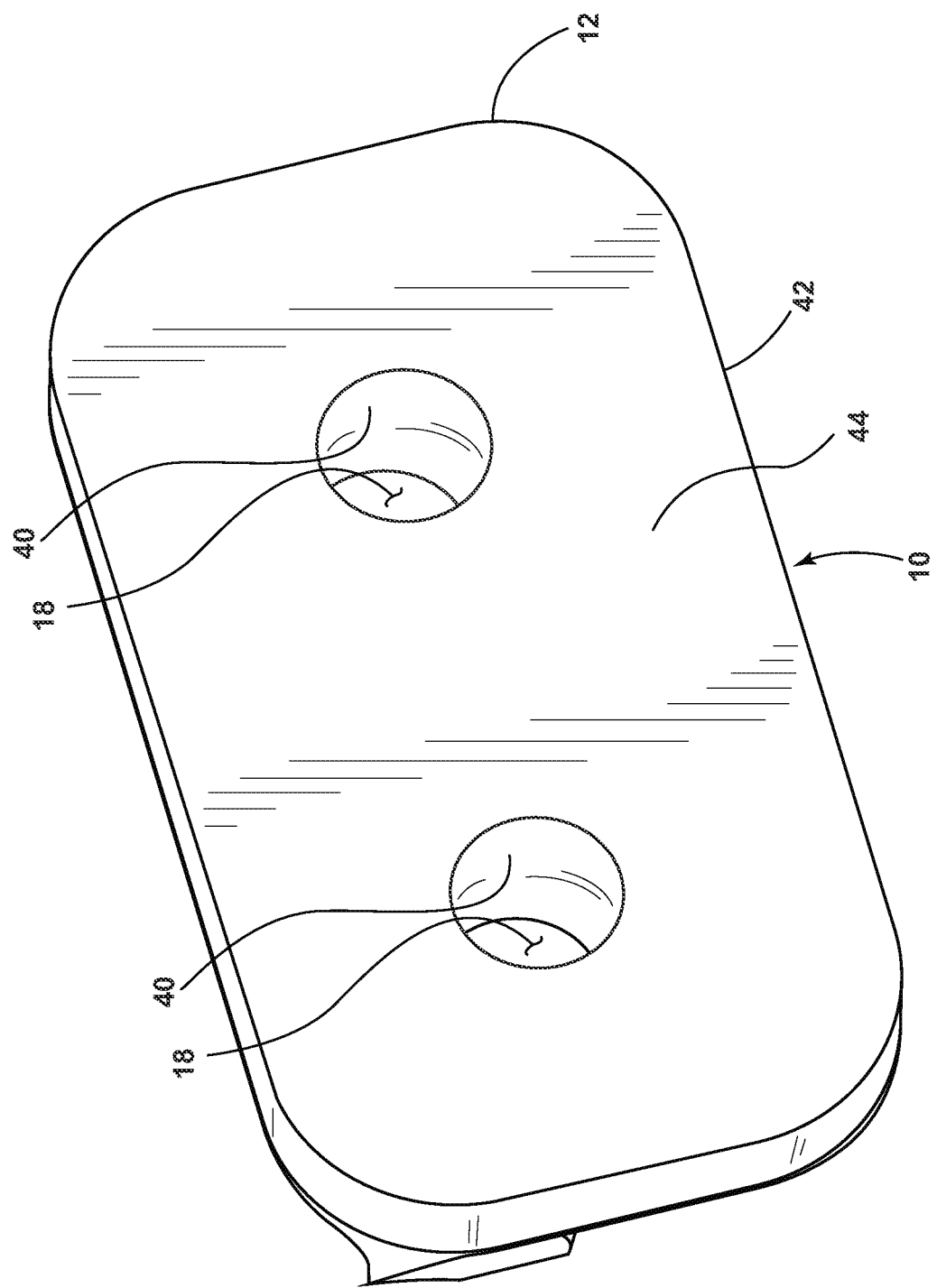
FIG. 7 is a bottom perspective view of the stud support of FIG. 3.

Referring now to FIG. 7, the lower surface of the base 12 defines a bottom wall 42, which includes a recessed portion 44. The recessed portion 44 is configured to maintain a relatively consistent thickness throughout the base 12 and add strength and rigidity.

Referring again to FIGS. 1 and 2, to assemble the stud support 10 to a snowmobile track 2, a stud 3 is inserted through the backside of the track 2 and is fit into one of the first or second bosses 14, 16. The stud 3 may be press fit, threaded, or otherwise secured inside the first and second bosses 14, 16. The bore 40 of each of the first and second bosses 14, 16 is configured for receiving the stud 3. The assembly process is repeated for the remaining boss.

The stud support 10 can be made of a hard plastic material, such as nylon, aluminum, carbon fiber, steel, composite, or any other suitable, lightweight, yet strong material. Further, the stud support 10 can be formed of a one piece or a multiple piece construction. The stud support 10 provides a lightweight and strong solution for supporting a traction stud 3. Additionally, as noted above, the multiple peaks 22, 28, and 34 provide additional traction for the snowmobile 1.

Figure 8:
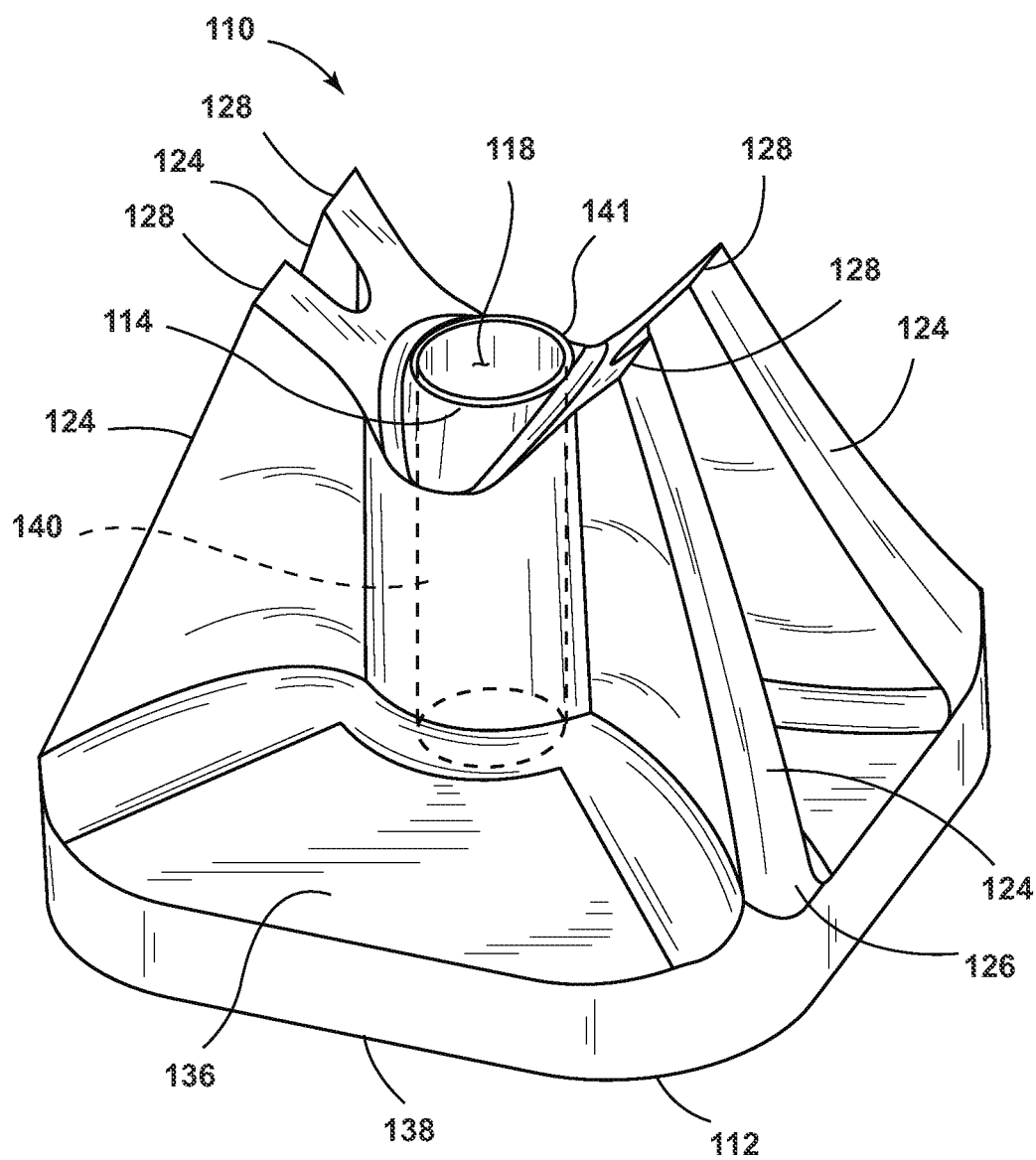
FIG. 8 is a perspective view of a second embodiment of a stud support of the present invention.
Figure 9:
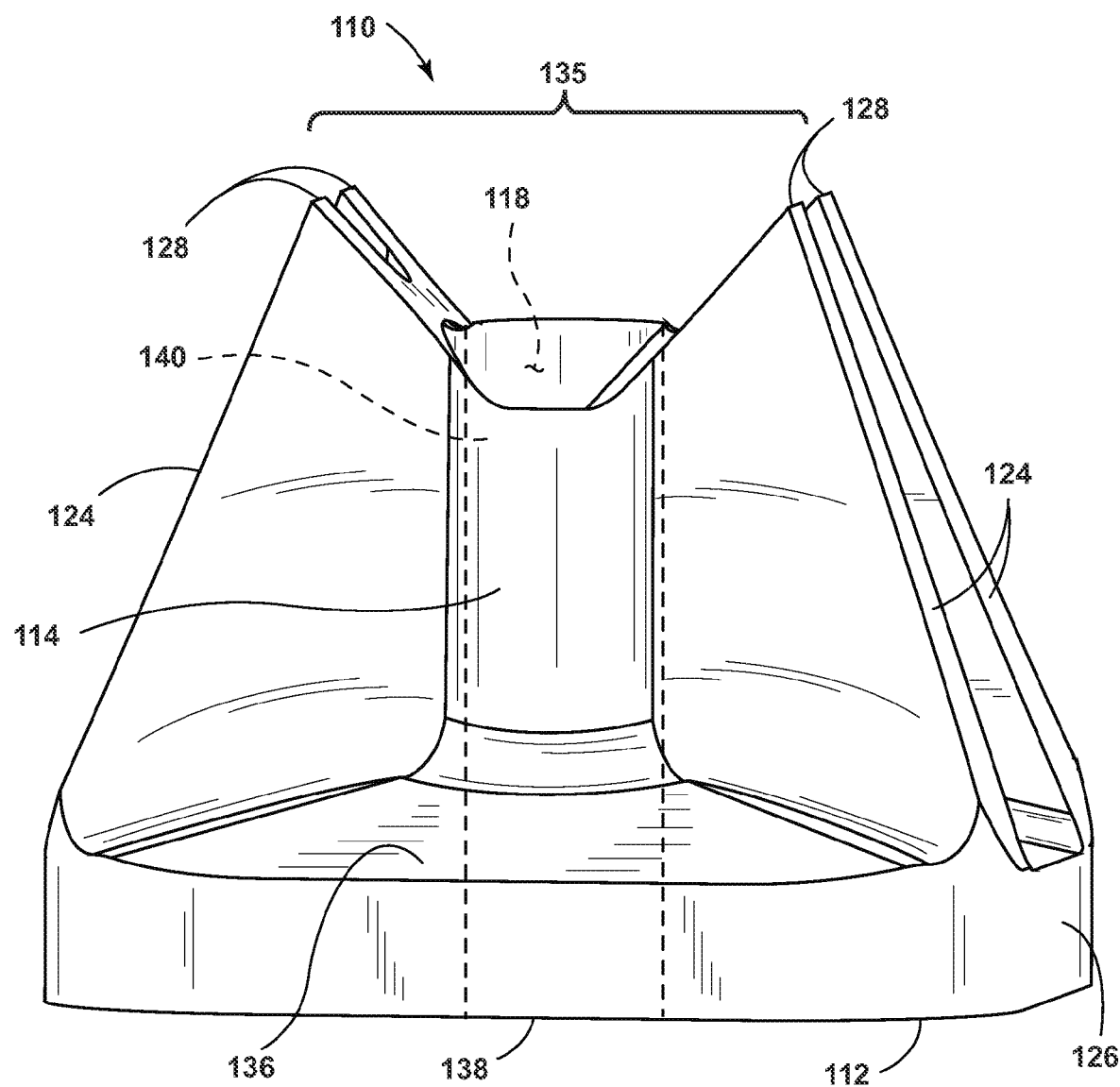
FIG. 9 is a side view of the stud support of FIG. 8.
Figure 10:
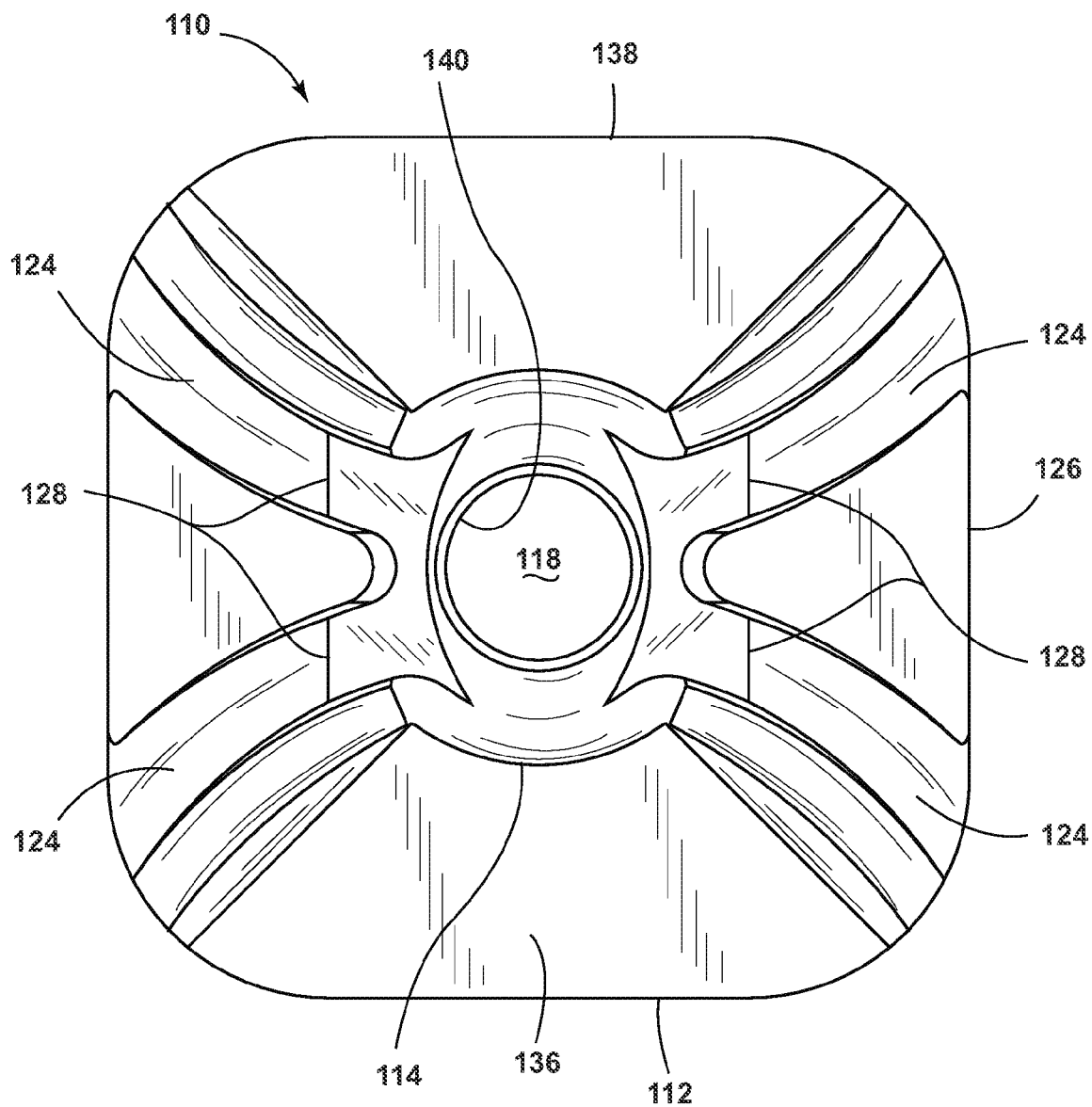
FIG. 10 is a top view of the stud support of FIG. 8.
Figure 11:
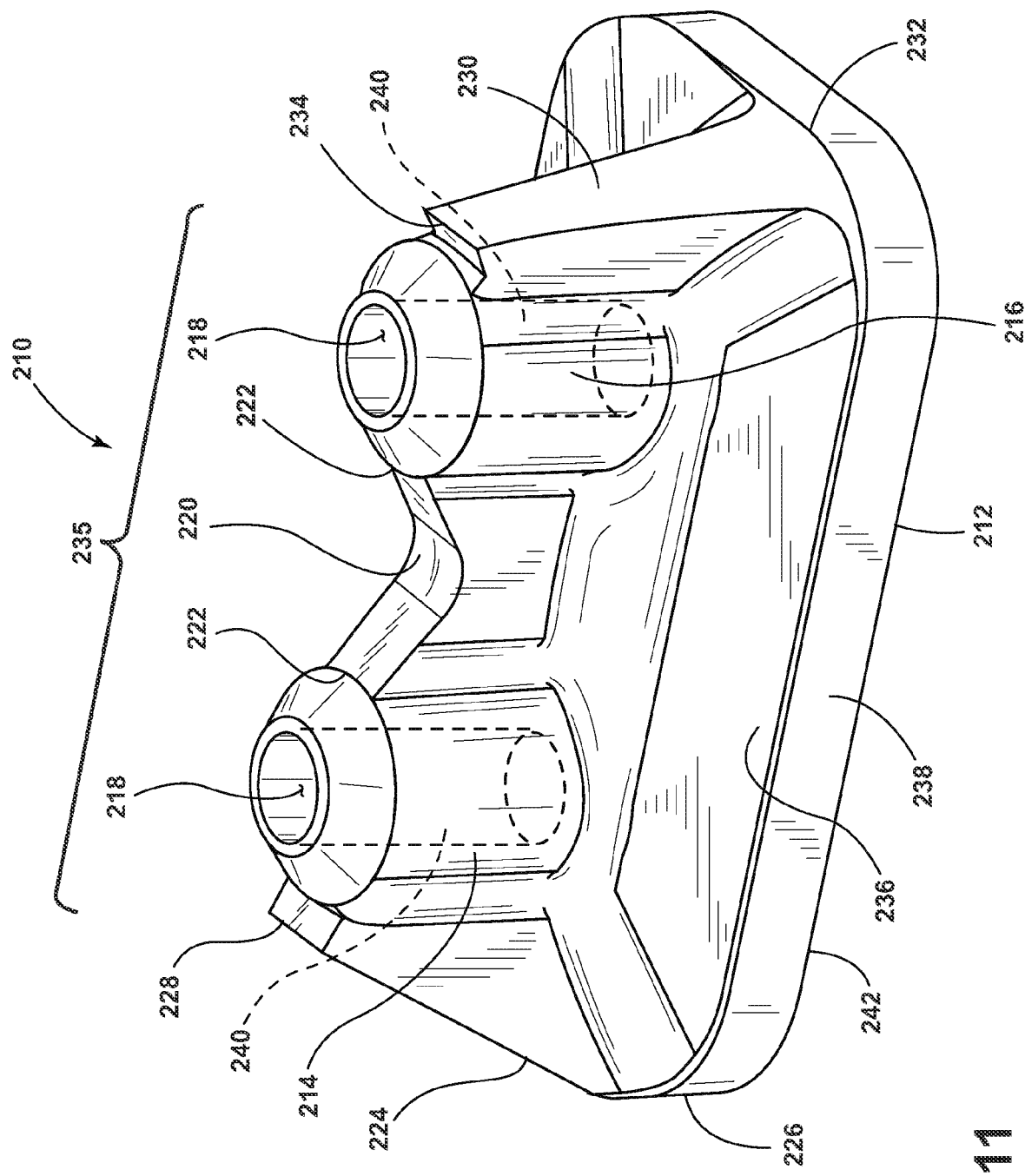
FIG. 11 is a perspective view of another embodiment of a stud support of the present invention.
Figure 12:
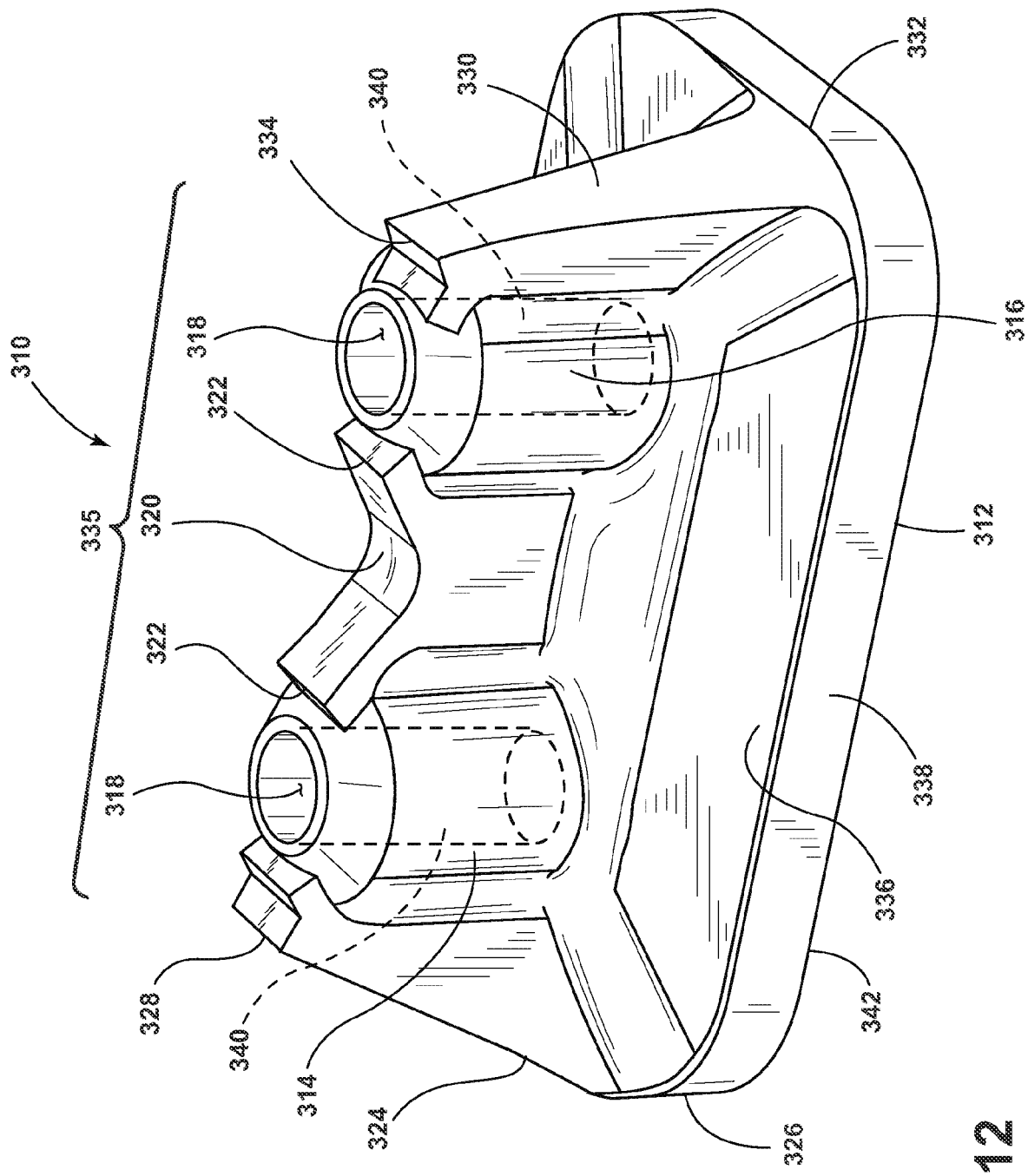
FIG. 12 is a perspective view of another embodiment of a stud support of the present invention.
Figure 13:
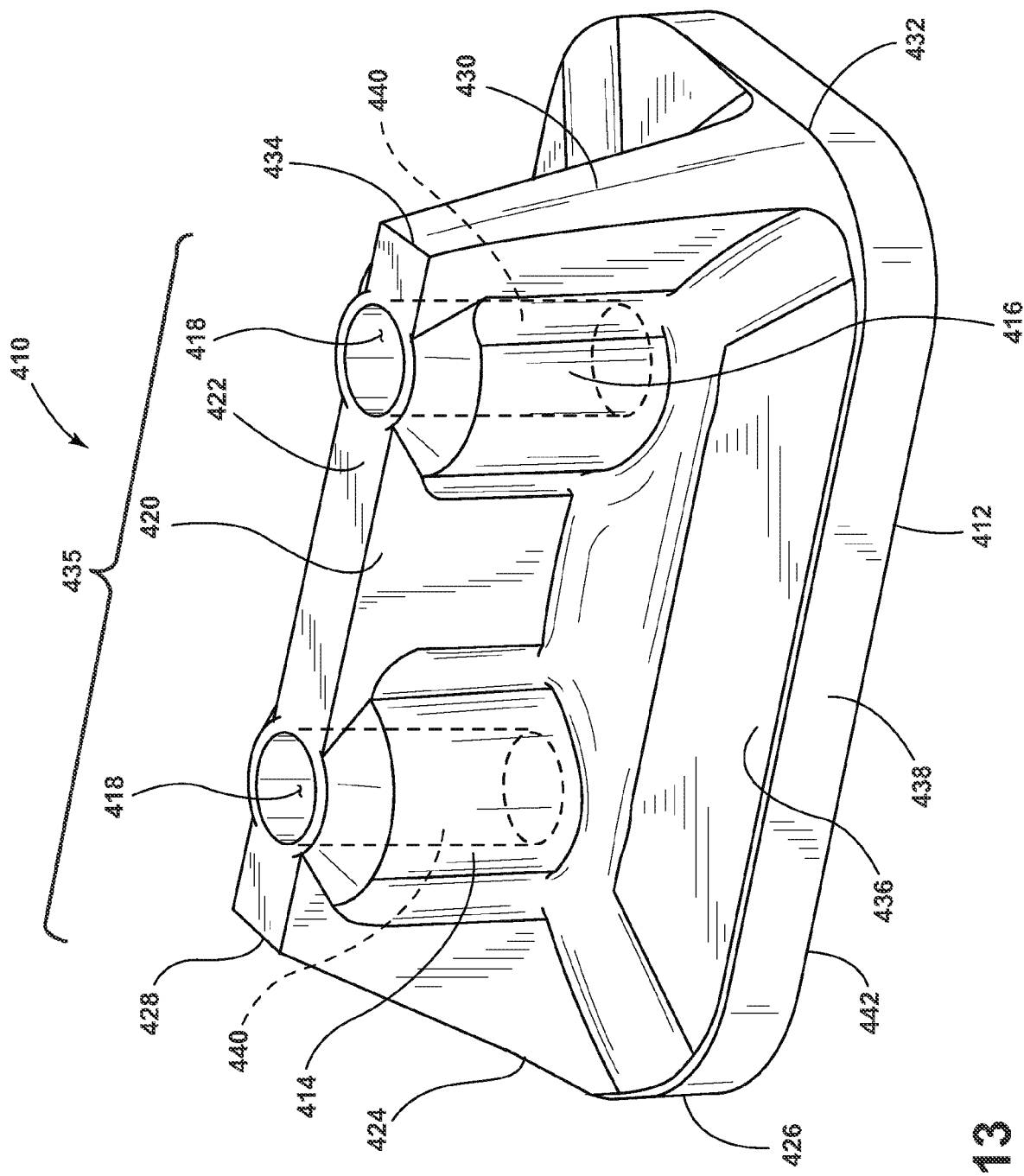
FIG. 13 is a perspective view of another embodiment of a stud support of the present invention.

Referring to FIGS. 8-10, a second embodiment of a single stud support 110 is designed for use with the stud 3 (FIG. 2) on the snowmobile track 2 (FIG. 2). The single stud support 110 comprises a base 112 and a boss 114, which extends up from the base 112. The boss 114 includes a boss aperture 118 and a bore 140. Further, the boss 114 may be beveled or chamfered at a distal end 141 thereof.

The single stud support 110 includes a plurality of support flanges 124 which extend from the boss 114. Each support flange 124 tapers inwardly from an edge 126 of the base 112 to a peak 128 adjacent the boss 114. The height of the peak 128 is configured to be greater than the height of the boss 114, such that the peaks 128 extend above the boss 114. However, it is also contemplated that the peaks 128 terminate at the same distance from the base 112 as the boss 114. Additionally, the support flanges 124 may be slightly arcuate in horizontal cross-section, and the thicknesses of the support flanges 124 proximate the base 112 are greater than the thickness at the peaks 128.

In the illustrated example, the single stud support 110 is shown having four unequally spaced support flanges 124. In this configuration, the support flanges 124 are positioned in pairs on substantially opposite sides of the boss 114. Other configurations are feasible, however, such as having the four support flanges 124 evenly spaced around the boss 114. Together, the support flanges 124 define an arcuate web 135, which enables the single stud support 110 to provide additional traction for the snowmobile 1.

The single stud support 110 includes a tapered top wall 136, a center portion 138, a bottom wall 142, and a recessed portion and is assembled to the snowmobile track 2 (FIG. 2) as described above. The flanges disclosed in detail above may take on a variety of shapes and constructions. For example, the flanges may have a square, rectangular, rounded, or other geometrical design conducive to increasing traction and stability.

Referring now to FIGS. 11-21, alternate embodiments of the stud support are illustrated. The subsequent embodiments are similar to the first embodiments 10 and 110. Therefore, like parts will be identified with like numerals increased by 100, with it being understood that the description of the like parts of the first embodiments apply to the later embodiments, unless otherwise noted. In one embodiment, illustrated in FIG. 11, a height of the web 235 is less than a height of the first and second bosses 214, 216. In the embodiment illustrated in FIG. 12, the height of the web 335 is substantially equal to the height of the first and second bosses 314, 316. Additionally, the center peaks 322 have a height substantially equal to the height of the first and second peaks 328 and 334. The embodiment illustrated in FIG. 13 also has a web 435 with a height substantially equal to the height of the first and second peaks 428 and 434, but the web 435 has a substantially flat upper surface, instead of peaks.

Figure 14:
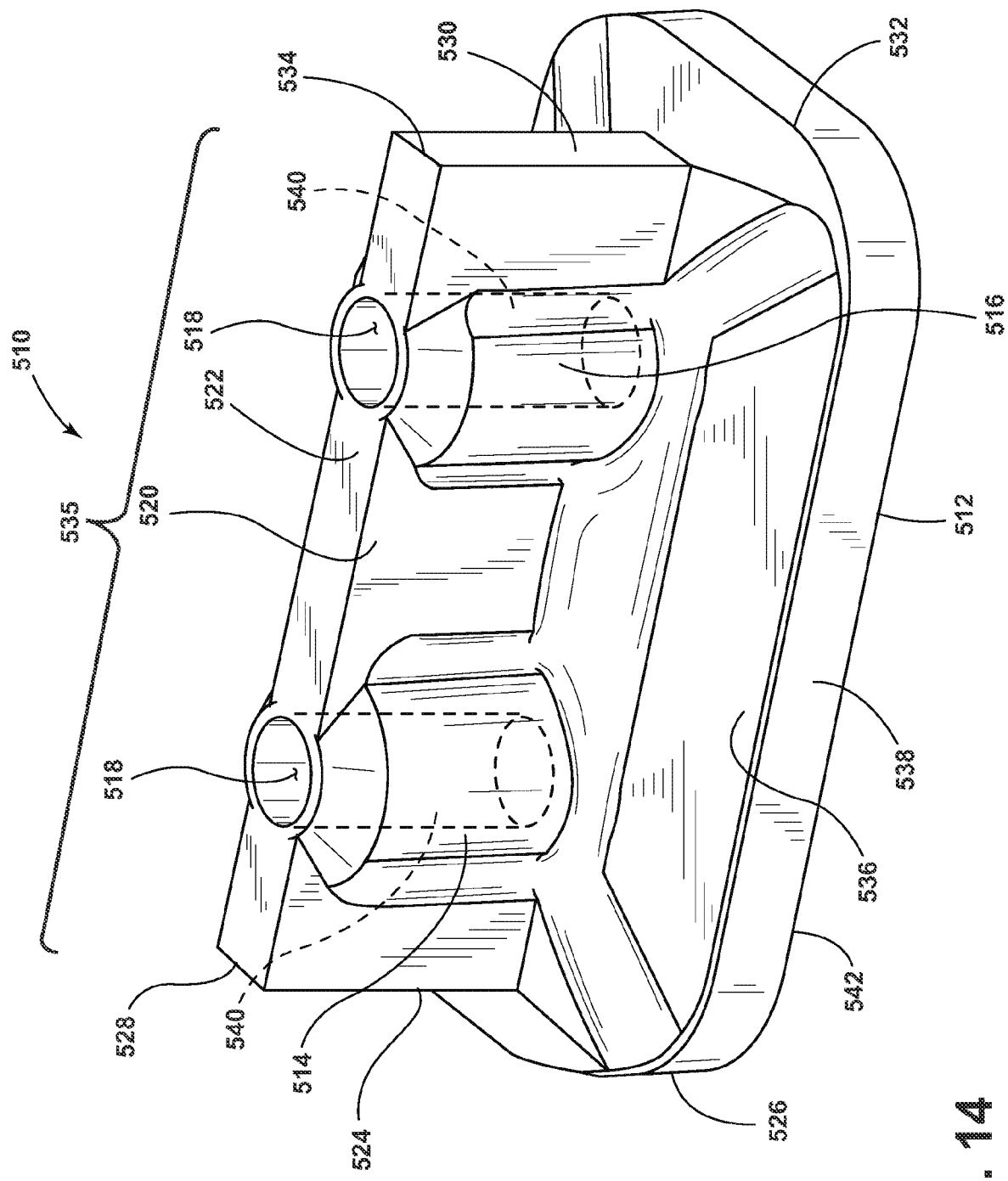
FIG. 14 is a perspective view of another embodiment of a stud support of the present invention.
Figure 15:
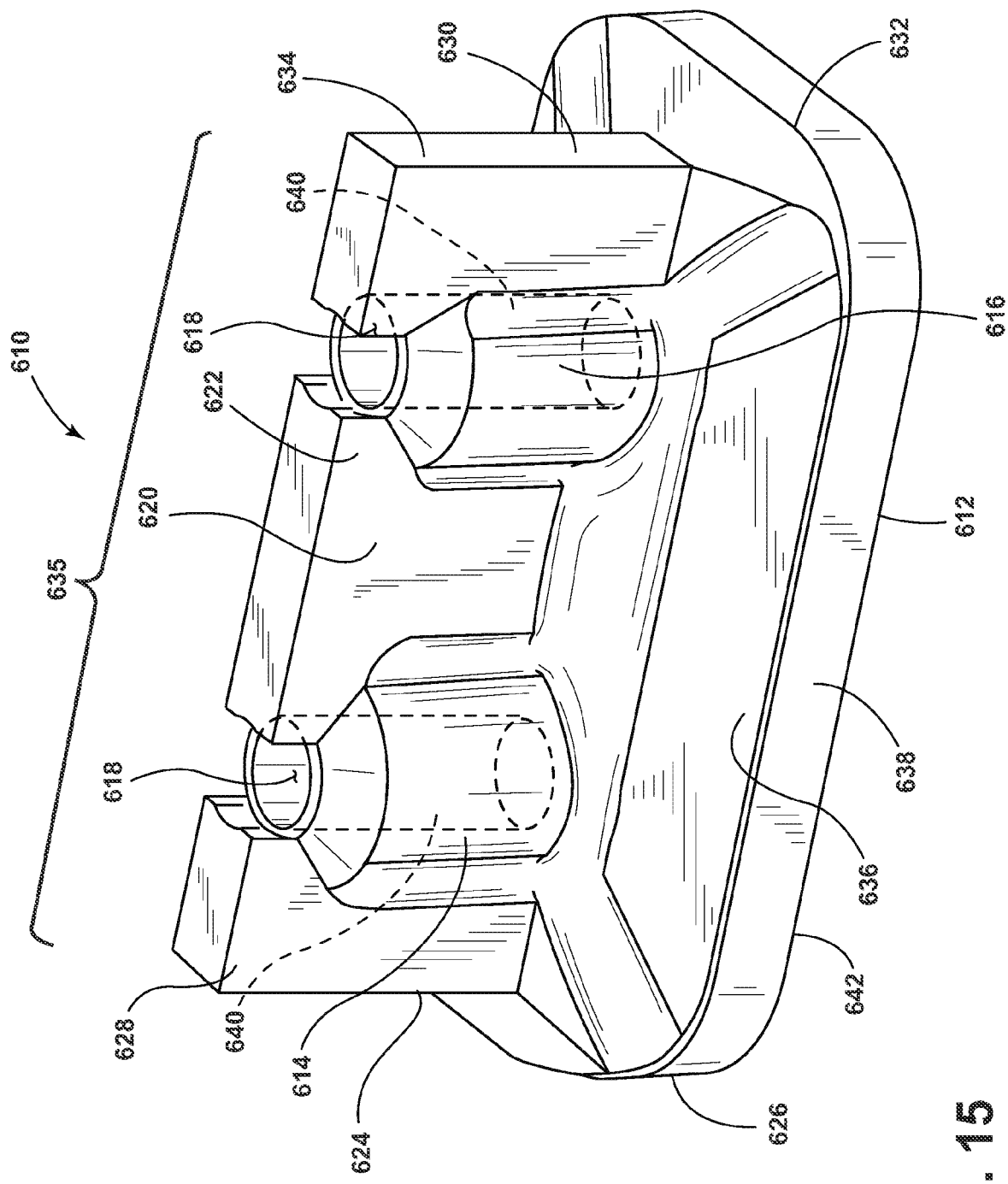
FIG. 15 is a perspective view of another embodiment of a stud support of the present invention.
Figure 16:
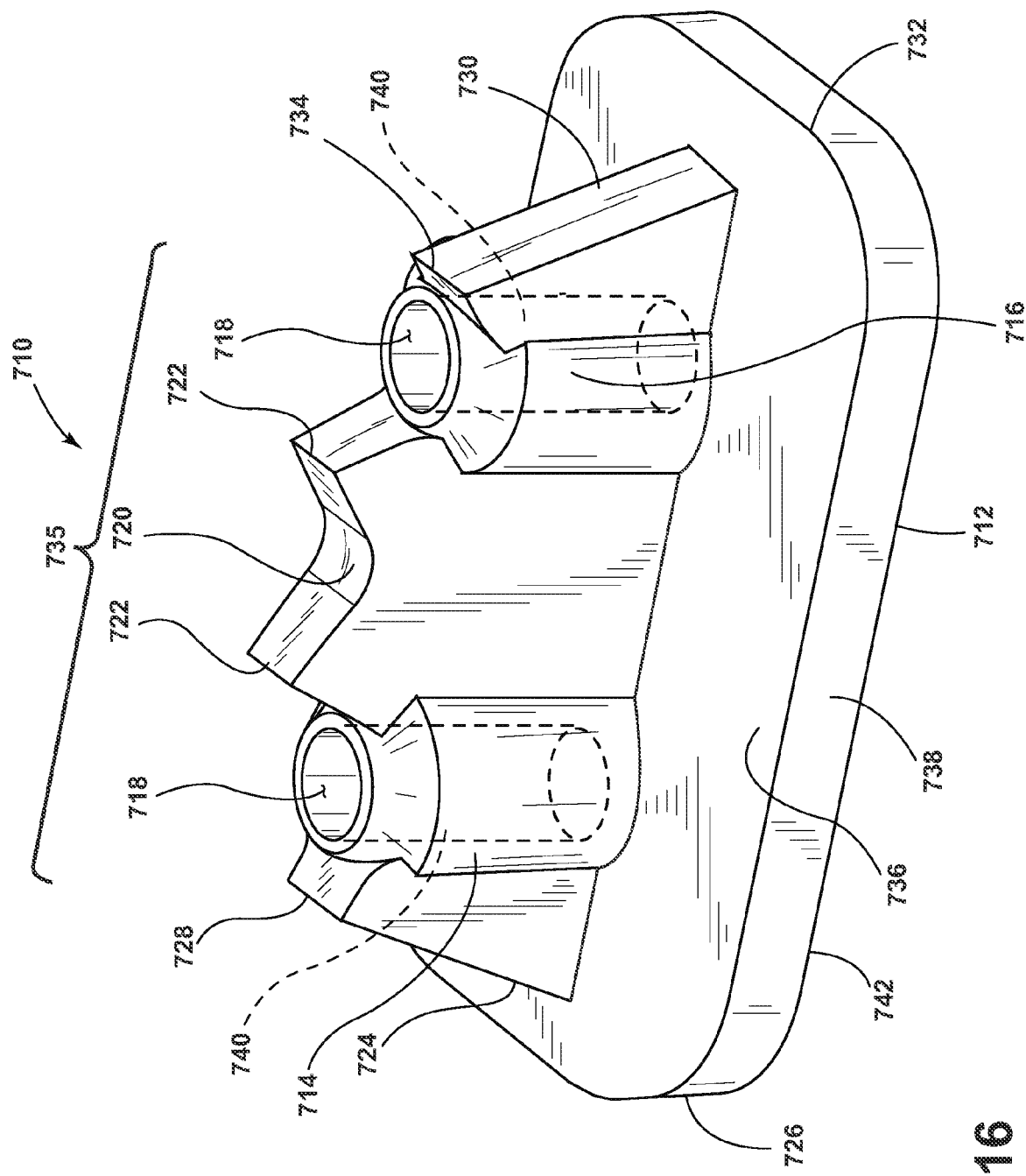
FIG. 16 is a perspective view of another embodiment of a stud support of the present invention.
Figure 17:
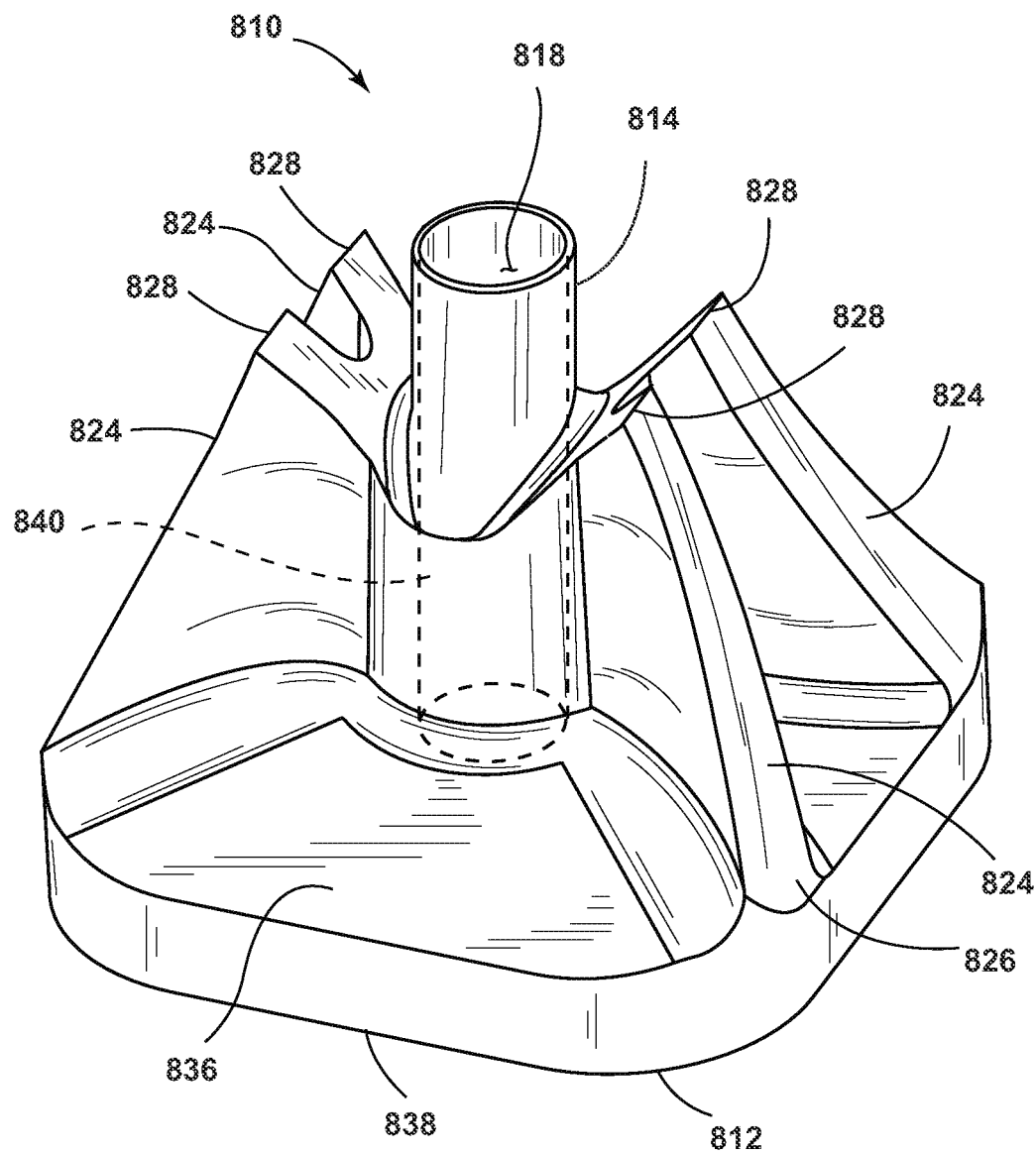
FIG. 17 is a perspective view of another embodiment of a stud support of the present invention.
Figure 18:
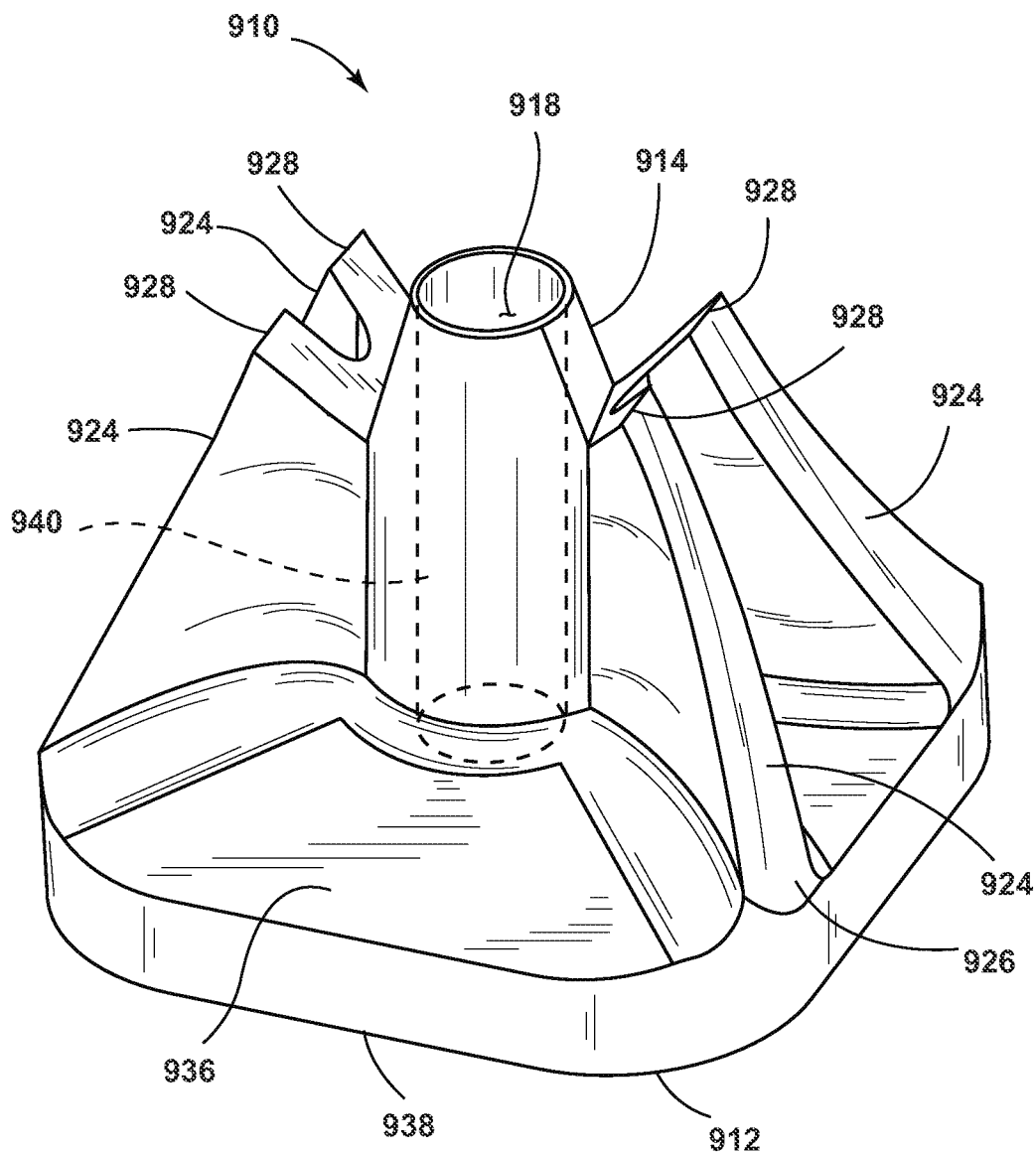
FIG. 18 is a perspective view of another embodiment of a stud support of the present invention.
Figure 19:
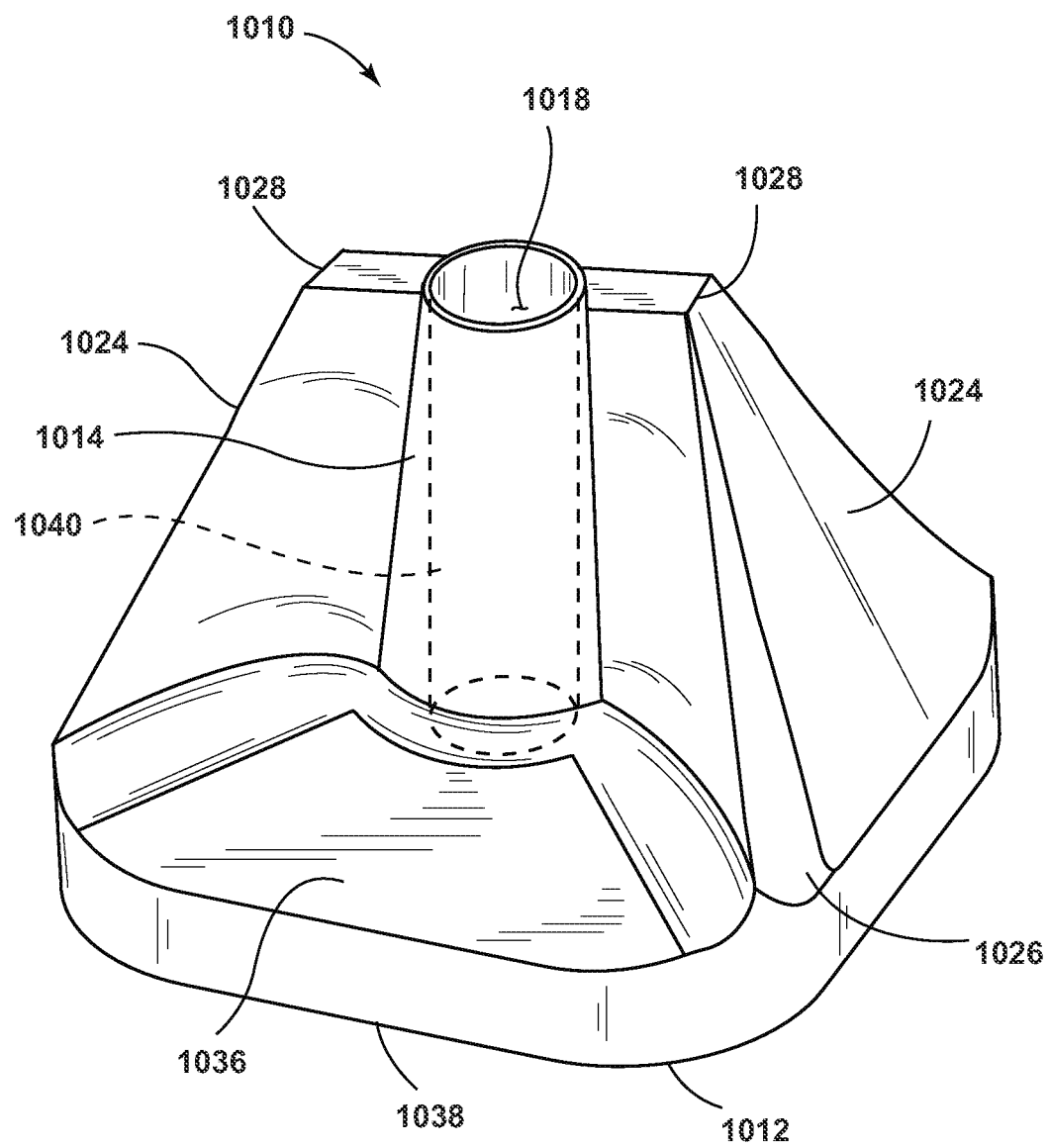
FIG. 19 is a perspective view of another embodiment of a stud support of the present invention.

Referring now to the embodiments illustrated in FIGS. 14 and 15, the stud supports 510 and 610 are shown having generally linear webs 535 and 635, respectfully; and each web 535, 635 has a substantially flat upper surface, as opposed to peaks. The web 535 includes substantially vertical first and second side flanges 524 and 530, and the height of the web 535 is substantially equal to the height of the first and second bosses 514, 516. Alternatively, the web 635 has a height greater than the height of the first and second bosses 614, 616. Similarly, the stud support 710, illustrated in FIG. 16, includes multiple peaks 728, 722, and 734, which form the web 735; however, the web 735 is linear, not arcuate, as in the embodiment shown in FIG. 6, for example.

Referring now to FIGS. 17-22, alternate embodiments of the single stud support are illustrated. In the single stud support shown in FIG. 17, the support flanges 824 includes peaks 824 that have a height less than a height of the boss 814. Similarly, in the embodiment illustrated in FIG. 18, the peaks 924 have a height substantially equal to the height of the boss 914. Alternatively, the support flanges 924 in the embodiment illustrated in FIG. 19 have a substantially flat upper surface, as opposed to peaks.

Figure 20:
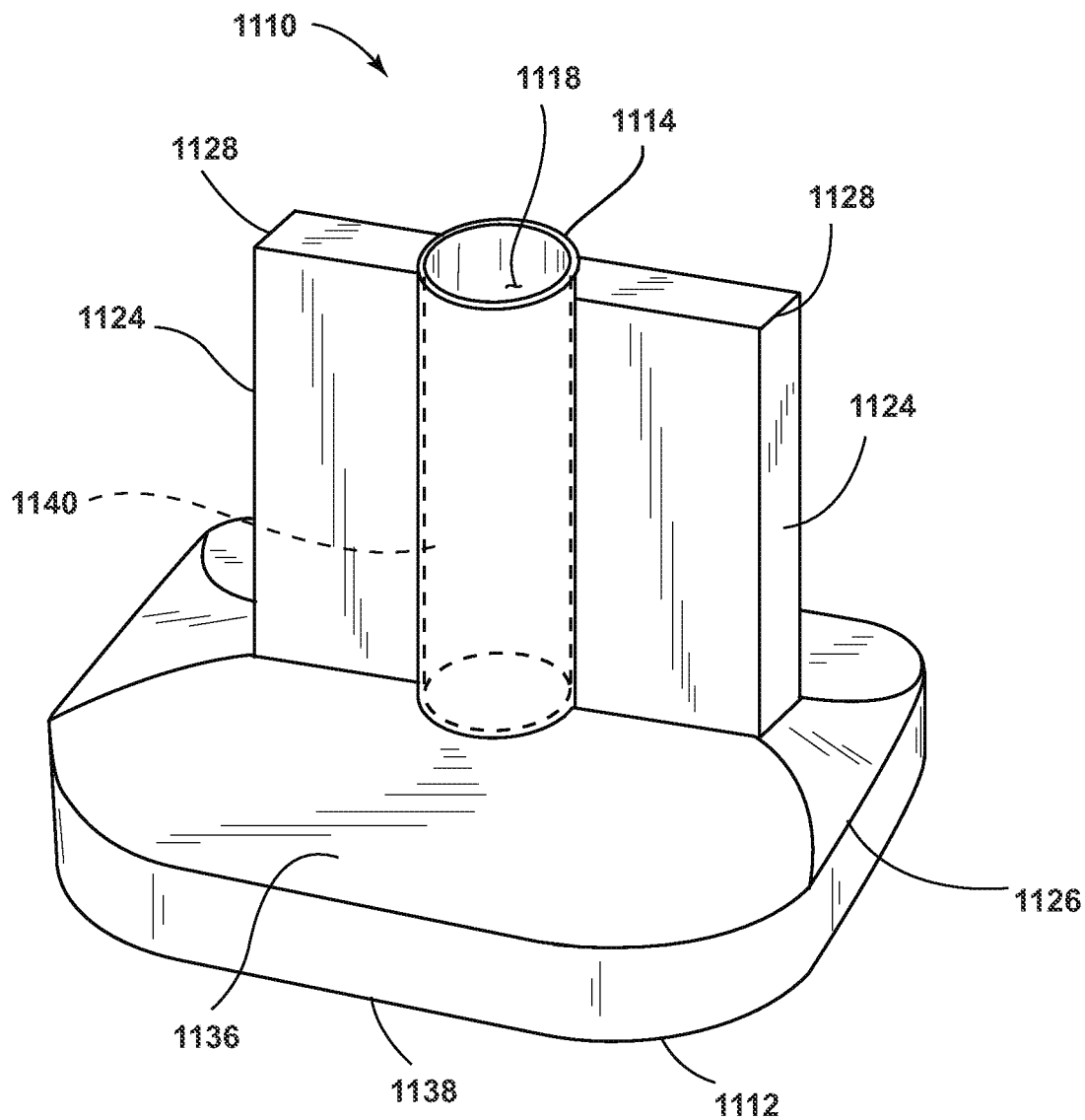
FIG. 20 is a perspective view of another embodiment of a stud support of the present invention.
Figure 21:
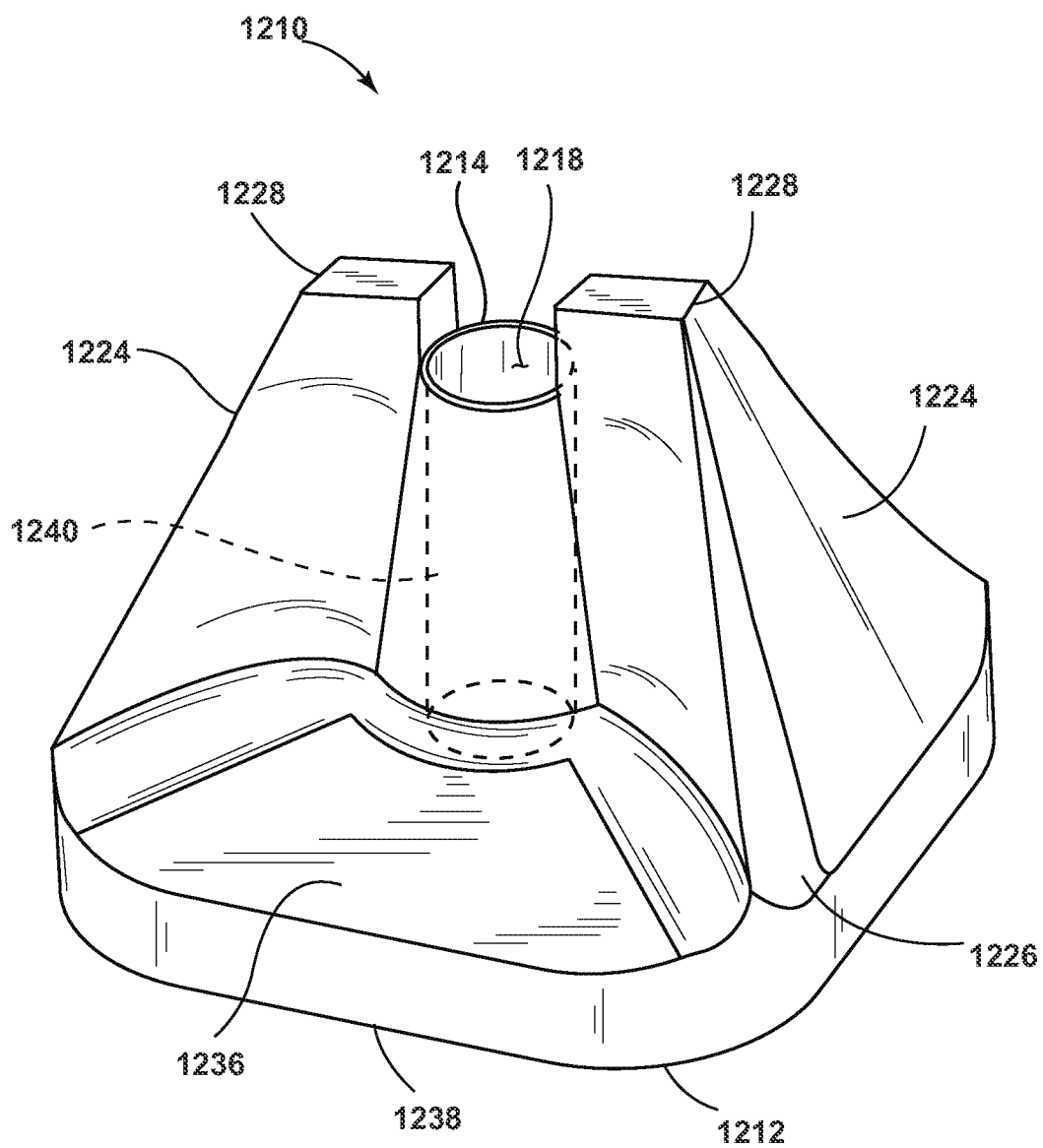
FIG. 21 is a perspective view of another embodiment of a stud support of the present invention.
Figure 22:
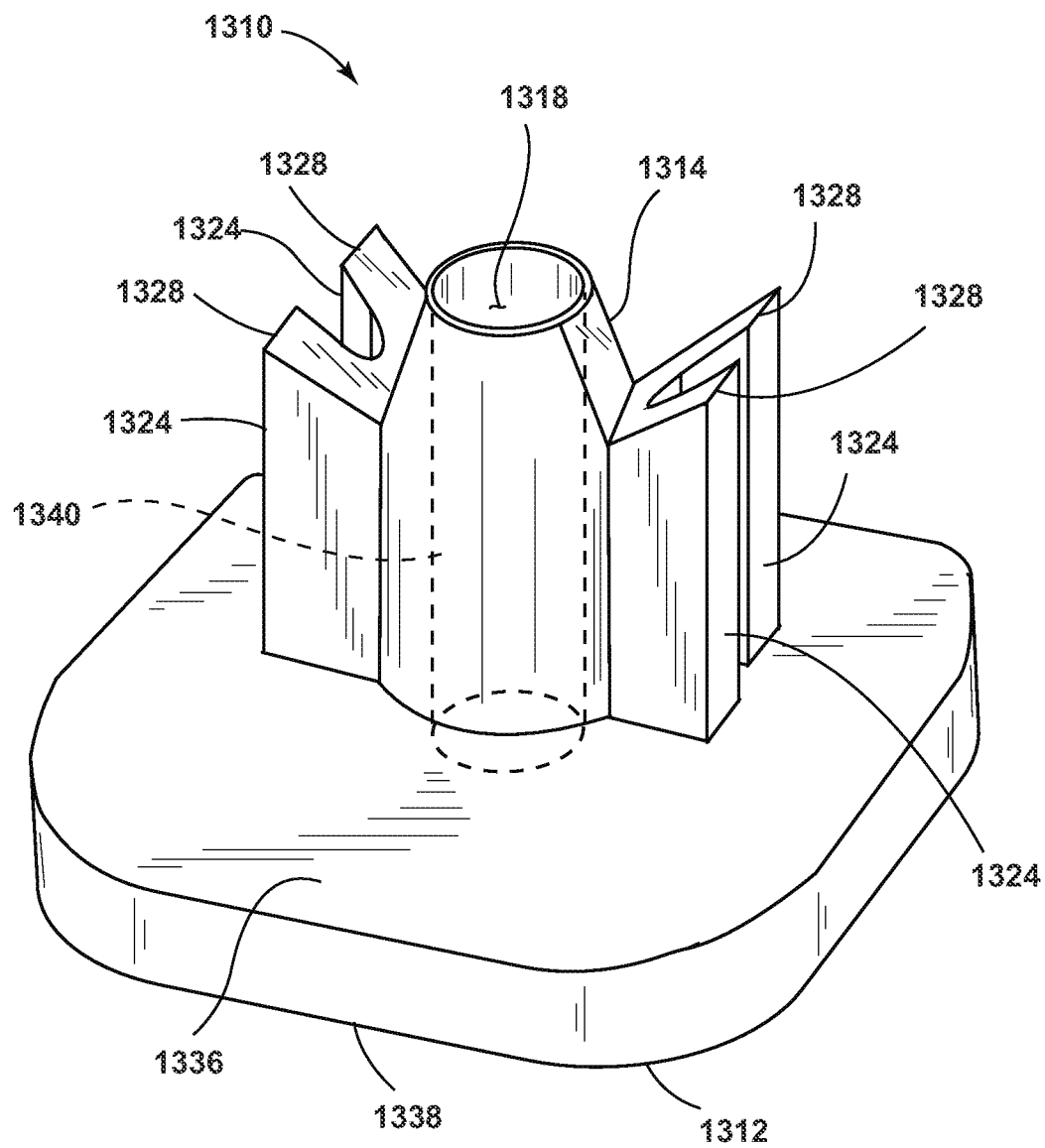
FIG. 22 is a perspective view of another embodiment of a stud support of the present invention.

Referring to FIG. 20, the illustrated embodiment includes support flanges 1024 which have substantially flat upper surfaces and substantially vertical side edges. Also, the height of the support flanges 1024 is approximately equal to the height of the boss 1114. The embodiment illustrated in FIG. 21 includes support flanges 1224 which have a substantially flat upper surface, and a height that is greater than the height of the boss 1214. Lastly, in another embodiment, the support flanges 1324 include peaks 1328, which are substantially equal in height to the height of the boss 1314, and the side edges of the support flanges 1324 are substantially vertical.

It will be understood by one having ordinary skill in the art that the embodiments illustrated in the figures are examples of the stud supports, and that various combinations of the elements discussed herein could be made.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A snowmobile track stud support comprising:
a base configured to be coupled to a track of a snowmobile and provide traction to the track;
first and second bosses extending from the base, each boss including a boss aperture;
a stud extending through the boss aperture, the stud coupling the base to the track and providing additional traction to the track;
a central support flange extending from and disposed between the first and second bosses;
a first side flange extending from the first boss to a first edge of the base; and
a second side flange extending from the second boss to a second edge of the base,
wherein the central support flange, the first side flange, and the second side flange together define a web.

2. The snowmobile track stud support of claim 1, wherein the central support flange includes at least one center peak that extends beyond the first and second bosses.

3. The snowmobile track stud support of claim 2, wherein the first side flange includes a first peak that extends beyond the first boss, and the second side flange includes a second peak that extends beyond the second boss.

4. The snowmobile track stud support of claim 3, wherein the at least one center peak has a height at least substantially equal to a height of the first and second peaks.

5. The snowmobile track stud support of claim 1, wherein a height of the web is at least substantially equal to a height of the first and second bosses.

6. The snowmobile track stud support of claim 1, wherein a height of the web is less than a height of the first and second bosses.

7. The snowmobile track stud support of claim 1, wherein the web has an arcuate construction.

8. The snowmobile track stud support of claim 1, comprising two or more webs.

9. A snowmobile track stud support comprising:
a base configured to be coupled to a track of a snowmobile;
a boss extending from the base and including a boss aperture;
a stud extending through the boss aperture and coupling the base to the track; and
a plurality of support flanges extending from above the boss aperture to an edge of the base.

10. The snowmobile track stud support of claim 9, wherein the plurality of support flanges each include an upstanding peak.

11. The snowmobile track stud support of claim 10, wherein the peaks have a height at least substantially equal to a height of the boss.

12. The snowmobile track stud support of claim 9, wherein the support flanges have a height less than a height of the boss.

13. The snowmobile track stud support of claim 9, wherein the support flanges are evenly spaced around the boss.

14. The snowmobile track stud support of claim 9, wherein the support flanges are unevenly spaced around the boss.

15. The snowmobile track stud support of claim 14, wherein the support flanges are positioned in pairs on opposed sides of the boss.

16. The snowmobile track stud support of claim 9, wherein the support flanges include an arcuate construction.

17. The snowmobile track stud support of claim 9, wherein the plurality of support flanges each have a substantially flat upper surface.

18. A snowmobile track stud support comprising:
a base configured to be coupled to a track of a snowmobile;
first and second bosses extending from the base, each boss including a distal end with a boss aperture that receives a stud that secures the base to the track;
a central support flange extending from an outer surface of the first and second bosses and disposed between the first and second bosses and including at least one peak that extends past the distal end of the first and second bosses;
a first side flange extending from the first boss to a first edge of the base; and
a second side flange extending from the second boss to a second edge of the base,
wherein the central support flange, the first side flange, and the second side flange together define a web.

19. The snowmobile track stud support of claim 18, wherein the web has an arcuate construction.

20. The snowmobile track stud support of claim 18, wherein the web has a linear construction.

* * * * *